(12) United States Patent
Fukagawa et al.

(10) Patent No.: US 8,165,248 B2
(45) Date of Patent: Apr. 24, 2012

(54) WIRELESS DISTANCE MEASUREMENT SYSTEM AND WIRELESS TERMINAL

(75) Inventors: Takashi Fukagawa, Kanagawa (JP); Yoichi Nakagawa, Tokyo (JP); Hirohito Mukai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 12/639,754

(22) Filed: Dec. 16, 2009

(65) Prior Publication Data

US 2010/0183063 A1  Jul. 22, 2010

(30) Foreign Application Priority Data

Dec. 18, 2008  (JP) .................................. 2008-322384
Dec. 7, 2009  (JP) .................................. 2009-277532

(51) Int. Cl.
*H04L 27/06* (2006.01)
(52) U.S. Cl. ..................... 375/340; 375/354; 455/456.1; 342/47; 342/118; 342/134
(58) Field of Classification Search .................. 375/141, 375/147, 149, 354, 355, 358, 340; 455/404.2, 455/440, 456.1, 67.11; 342/46, 47, 85, 109, 342/118, 119, 131, 132, 134
See application file for complete search history.

(56) References Cited

U.S. PATENT DOCUMENTS

| | | | |
|---|---|---|---|
| 5,030,807 A | | 7/1991 | Landt |
| 6,181,944 B1 * | | 1/2001 | Uebayashi et al. ........ 455/456.2 |
| 6,297,773 B1 * | | 10/2001 | Fullerton et al. ............... 342/457 |
| 6,606,054 B2 * | | 8/2003 | Okamura ...................... 342/145 |
| 6,859,165 B2 * | | 2/2005 | Matsuoka ..................... 342/118 |
| 2010/0220818 A1 * | | 9/2010 | Yamamoto et al. .......... 375/340 |

FOREIGN PATENT DOCUMENTS

| | | |
|---|---|---|
| JP | 04-218789 | 8/1992 |
| JP | 2008-005133 | 1/2008 |

* cited by examiner

*Primary Examiner* — Dac Ha
(74) *Attorney, Agent, or Firm* — Dickinson Wright PLLC

(57) ABSTRACT

A wireless distance measurement system and wireless terminal improve the accuracy of distance measurement when the UWB communication scheme is used. In wireless terminal 200, a route of signals varies between a distance measuring operation and a synchronization establishing operation, and, when the distance measuring operation is performed, a detection result is inputted to comparator 208 without passing through integrator 204. By this means, the distance measuring operation of wireless terminal 200 does not involve integration processing, so that delay time due to integration processing is not produced and, consequently, it is possible to improve the accuracy of distance measurement. Further, the distance measuring operation uses the integration result acquired integrator 204 for a comparison reference voltage used in comparator 208. By this means, the integration result removing noise signal components from a detection signal is used for the comparison reference voltage, so that the comparison reference voltage is optimized. Consequently, it is possible to further improve the accuracy of distance measurement.

10 Claims, 10 Drawing Sheets

WIRELESS DISTANCE MEASUREMENT SYSTEM AND WIRELESS TERMINAL

CROSS REFERENCE TO RELATED APPLICATIONS

The disclosures of Japanese Patent Application No. 2008-322384, filed on Dec. 18, 2008, and Japanese Patent Application No. 2009-277532, filed on Dec. 7, 2009, including the specifications, drawings and abstracts are incorporated herein by reference in their entirety.

TECHNICAL FIELD

The present invention relates to a wireless distance measurement system that measures distance using pulse signals, and a wireless terminal.

BACKGROUND ART

A UWB (Ultra Wide Band) communication scheme, which is an impulse radio scheme, is one of high-speed radio transmission techniques. With the UWB communication scheme, pulse signal sequences formed with pulse signals synchronized with predetermined cycle timings are used for communication. Accordingly, the UWB communication scheme is employed in the ultra wideband communication.

For example, UWB communication is known to use pulse signals having a very narrow pulse width of about 1 nano second instead of using carrier waves. With this UWB communication, a base station (i.e. reader) transmits pulse signals having a very narrow pulse width, to communication terminals, so that it is possible to perform accurate positioning (hereinafter, also referred to as "UWB positioning") of communication terminals in a multipath propagation environment.

However, with UWB communication, the upper limit of transmission power of a base station is determined from the perspective of interference against other systems. The power of signals transmitted from a base station attenuates due to propagation loss, and therefore a size of a communication area in a UWB communication system is practically limited. Further, communication terminals in a UWB communication system are generally small like tags. Therefore, in case where a battery is mounted on a communication terminal, it is assumed that the battery has a small current capacity like a button battery.

In view of above, in case where UWB positioning is performed in a desired area, communication terminals are naturally required to have adequate sensitivity and are furthermore required to employ configurations to realize power saving.

For example, Patent Literature 1 discloses a conventional positioning system. FIG. 1 shows a configuration of a tag disclosed in Patent Literature 1. The passive tag shown in FIG. 1 increases sensitivity with respect to an RF received signal based on a sensitivity control signal. Further, the tag disclosed in Patent Literature 1 adopts a scheme of backscattering signals from a base station, that is, switches between the state where radio waves from a reader are not reflected by making load impedance of antennas matched (that is, the state where code "0" is transmitted) and the state where radio waves are reflected by making impedances unmatched (that is, the state where code "1" is transmitted). Note that the passive scheme is a scheme adopted by a tag without a power supply. Accordingly, a communication area of the passive scheme is very small. For example, a communication area by a UWB band may be 1 meter or less.

For example, Patent Literature 2 discloses a conventional UWB communication tag. FIG. 2 discloses a configuration of the UWB communication tag disclosed in Patent Literature 2. With the UWB tag shown in FIG. 2, the filtering section extracts UWB pulse components from a received signal, the detecting section detects envelopes or detects peaks, and the integrating section integrates the detection result over a predetermined integration period (for example, over a time slot). Then, the signal demodulating section demodulates the baseband signal by deciding the data value (between "1" and "0") based on the decision criterion of whether or not the A/D conversion value of the integrated value acquired in the integrating section is equal to or greater than a threshold value. The UWB tag shown in FIG. 2 improves noise robustness by capturing synchronization while adjusting the integration period (i.e. time slot) in the integrating section.

CITATION LIST

Patent Literature

PTL 1: Japanese Patent Application. Laid-Open No. HEI4-218789
PTL 2: Japanese Patent Application Laid-Open No. 2008-5133

SUMMARY OF INVENTION

Technical Problem

As described above, similar to the UWB tag disclosed in Patent Literature 2, noise robustness in synchronization processing improves by integrating received signals. However, delay time is produced by integration processing, and therefore, there is a problem that, if the integration processing is used in distance measurement processing for measuring distance by measuring the round-trip time of a radio wave, the accuracy of distance measurement deteriorates.

It is therefore an object of the present invention to provide a wireless distance measurement system and wireless terminal that improve the accuracy of distance measurement when the UWB communication scheme is used.

Solution to Problem

To achieve to above object, the wireless distance measurement system according to the present invention that has a wireless base station and a wireless terminal and that measures a distance between the wireless base station and the wireless terminal using a pulse signal, employs a configuration in which: the wireless terminal has: a receiving section that receives a pulse signal sequence transmitted from the wireless base station; a detector that detects the received pulse signal sequence and outputs a detection signal; a synchronization establishing section that has: an integrator that integrates the detection signal per receiving timing candidate and outputs an integration result; and a detecting section that detects a synchronization timing with the wireless base station based on the integration result; and a distance measurement processing section that has: a holding section that holds the integration result; a comparator that outputs a binary signal matching an input signal using the integration result held in the holding section as reference data; and a pulse generating section that generates a transmission pulse signal based on the binary signal outputted from the comparator; the wireless base station has a calculating section that measures a time lag between a transmission timing for the pulse signal sequence and a receiving timing for a pulse signal sequence transmitted from the wireless terminal based on a pulse signal transmitted at the transmission timing, and calculates the distance based on the measured time lag; and a route of signals varies between a distance measuring operation and a synchronization establishing operation in the wireless terminal, and, when the distance measuring operation is performed, the detection signal is inputted to the comparator without passing through the integrator.

The wireless terminal according to the present invention employs a configuration which includes: a receiving section that receives a pulse signal sequence; a detector that detects the received pulse signal sequence and outputs a detection signal; a synchronization establishing section that has: an integrator that integrates the detection signal per receiving timing candidate and outputs an integration result; and a detecting section that detects a synchronization timing with a wireless base station based on the integration result; and a distance measurement processing section that has: a holding section that holds the integration result; a comparator that outputs a binary signal matching an input signal using the integration result held in the holding section as reference data; and a pulse generating section that generates a transmission pulse signal based on the binary signal outputted from the comparator, and in which a route of signals varies between a distance measuring operation and a synchronization establishing operation and, when the distance measuring operation is performed, the detection signal is inputted to the comparator without passing through the integrator.

ADVANTAGEOUS EFFECTS OF INVENTION

According to the present invention, it is possible to provide a wireless distance measurement system and wireless terminal that improve the accuracy of distance measurement when the UWB communication scheme is used.

DESCRIPTION OF EMBODIMENTS

Figure 1:
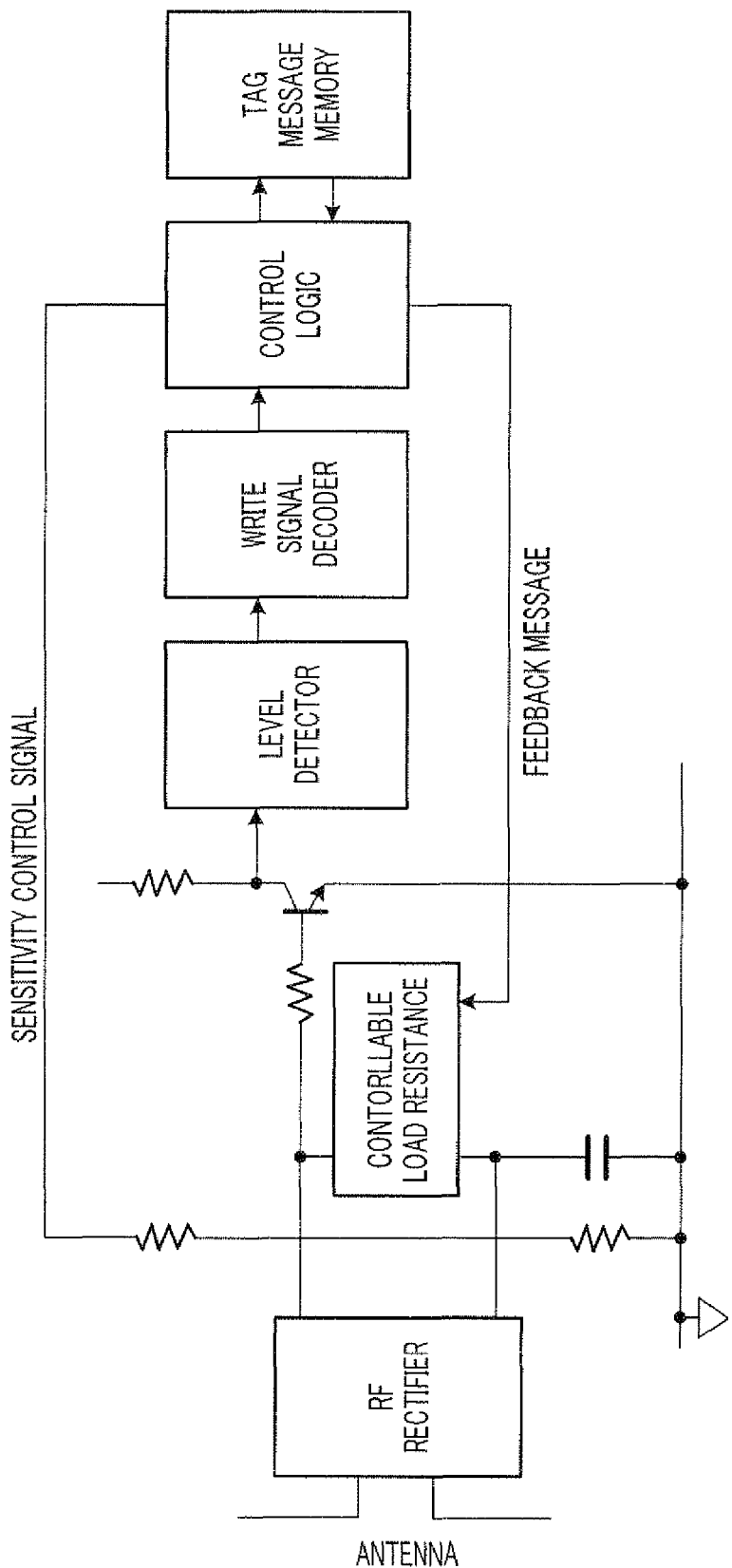
FIG. 1 shows a configuration of a conventional tag.
Figure 2:
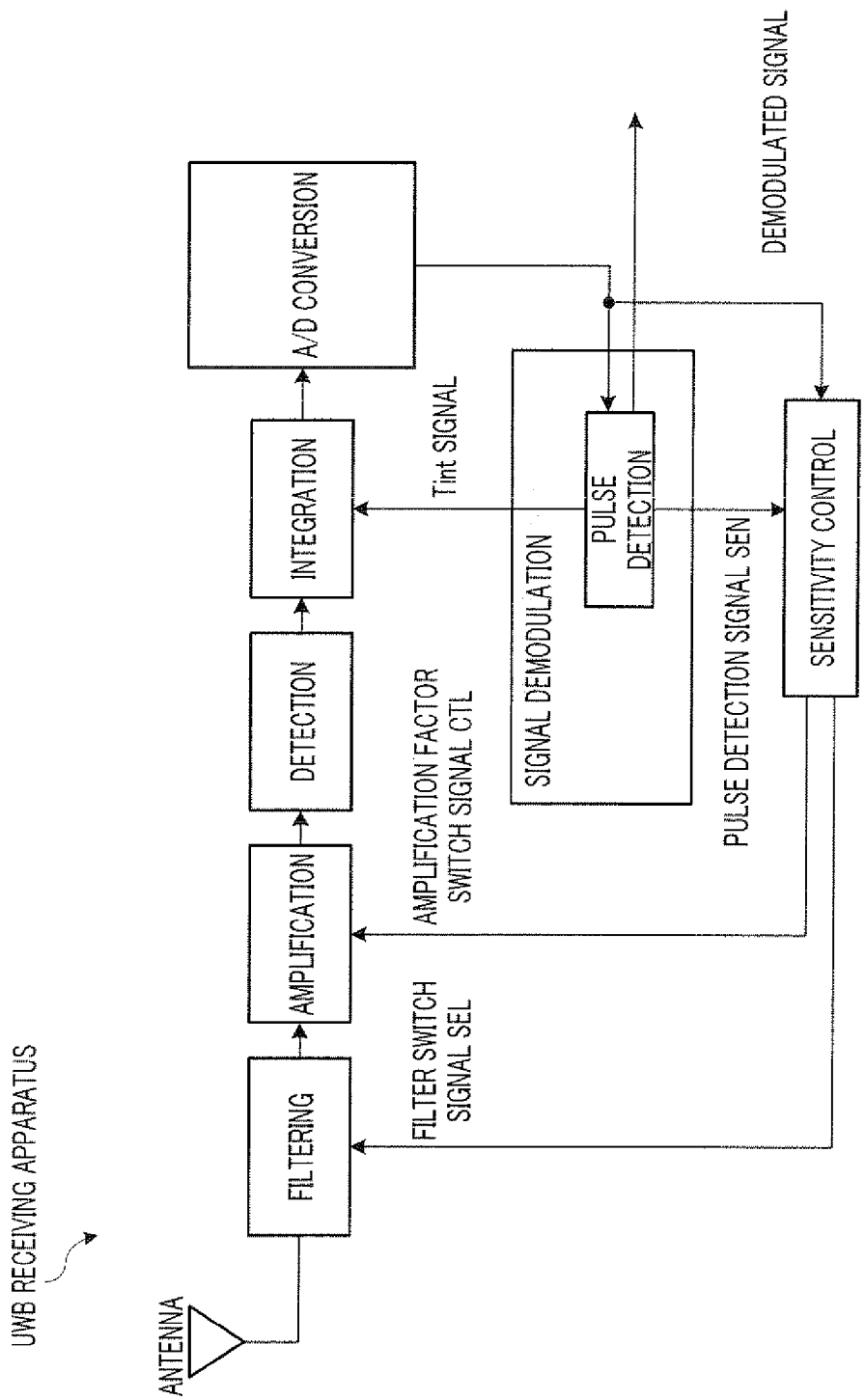
FIG. 2 shows a configuration of a conventional UWB communication tag.

Hereinafter, embodiments of the present invention will be explained in detail with reference to the accompanying drawings. Note that, with the following embodiments, the same components will be assigned the same reference numerals and overlapping explanation thereof will be omitted.

(Embodiment 1)
[The Configuration of the Base Station]

Figure 3:
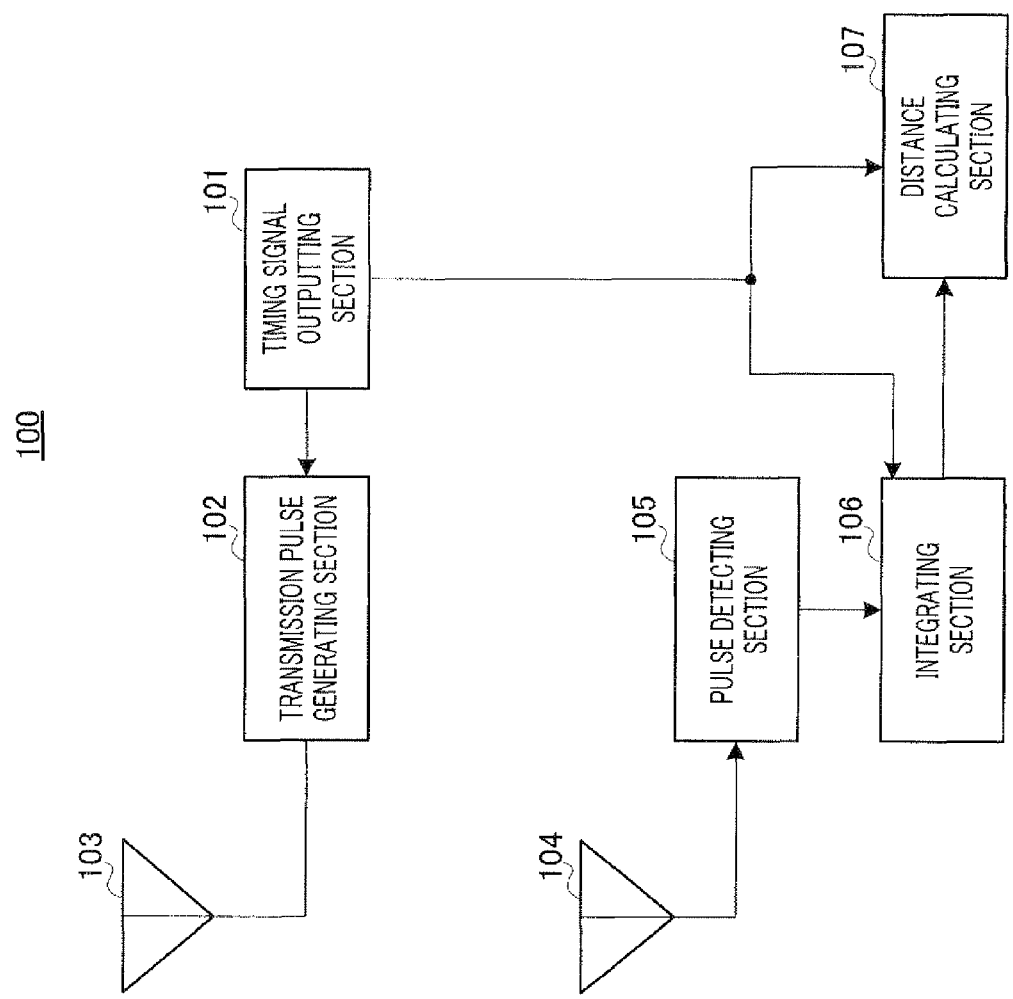
FIG. 3 is a block diagram showing a configuration of a base station of a wireless distance measurement system according to Embodiment 1 of the present invention.

FIG. 3 is a block diagram showing a configuration of base station 100 in a wireless distance measurement system according to Embodiment 1 of the present invention. Base station 100 is, for example, a reader apparatus (i.e. reader) that performs UWB communication.

In FIG. 3, base station 100 has timing signal outputting section 101, transmission pulse generating section 102, transmitting antenna 103, receiving antenna 104, pulse detecting section 105, integrating section 106 and distance calculating section 107.

Timing signal outputting section 101 generates clock signals at equal time intervals. The clock signals generated in timing signal outputting section 101 include two kinds, long cycle clock signals and short cycle clock signals. A long cycle clock is determined according to the measurement range. For example, if the maximum value of a measuring distance is 15 meters, the round-trip propagation distance of a radio wave is 30 meters and the maximum delay wave has 100 nano seconds. Further, a short cycle clock corresponds to the distance measurement resolution, and is generally set to a value equivalent to the UWB pulse width. 1 nano second corresponds to a distance resolution of 30 centimeters. Here, as a short cycle clock signal, a clock signal having a cycle of 1 nano second is generated, and, as a long cycle clock signal, a clock signal having a cycle of 100 nano seconds obtained by dividing a short cycle clock signal by 100, is generated. That is, a long cycle clock signal and a short cycle clock signal are synchronized at the cycle of the long cycle clock signal. The generated clock signals are outputted to transmission pulse generating section 102, integrating section 106 and distance calculating section 107. Hereinafter, the cycle of a long cycle clock signal will be simply referred to as a "long cycle," and the cycle of a short cycle clock signal will be simply referred to as a "short cycle."

Transmission puke generating section 102 generates a pulse signal based on the long cycle clock signal received from timing signal outputting section 101. Transmission pulse generating section 102 includes an amplifying circuit that performs excitation and amplification based on the long cycle clock signal, and a bandpass filter. For example, a step recovery diode is used for the amplifying circuit, and, in this case, in transmission pulse generating section 102, the step recovery diode is excited (i.e. edge shock excitation) at one of the rising edge and the trailing edge of the long cycle clock signal to amplify the current and the bandpass filter limits the band of the resulting signal. By this means, a pulse signal having a pulse width of about 1 nano second (that is, a pulse width of about a short cycle) is generated. In this way, a pulse signal is generated at the same cycle as the long cycle, and is transmitted as a pulse signal sequence through transmitting antenna 103.

Pulse detecting section 105 receives at receiving antenna 104 the pulse signal transmitted from wireless terminal 200 (described later). Pulse detecting section 105 detects the received pulse signal, and outputs the detection result signal to integrating section 106.

Integrating section 106 samples the detection result signal received from pulse detecting section 105, in synchronization with a short cycle clock signal. A sample signal is classified based on what number short cycle clock signal is used to perform sampling in each long cycle. That is, sample signals are classified separately based on short cycle clock numbers.

Here, 100 short cycle clock signals are generated during one long cycle, and therefore short cycle clock numbers from 1 to 100 are prepared.

Integrating section 106 integrates a sample signal in a plurality of long cycles separately based on short cycle clock signal numbers.

Distance calculating section 107 calculates the time a radio wave takes to make a round-trip between base station 100 and wireless terminal 200 (described later) based on a reference short cycle clock number which is generated by timing signal outputting section 101 and which matches a transmission puke and the short cycle clock number of the maximum integrated value. Then, the propagation delay time in space is calculated by subtracting the internal delay time in the internal circuit (described later) of wireless terminal 200 that is measured in advance. By multiplying this propagation delay time with the progress speed of the radio wave, the distance between base station 100 and wireless terminal 200 is calculated.

[The Configuration of the Wireless Terminal]

Figure 4:
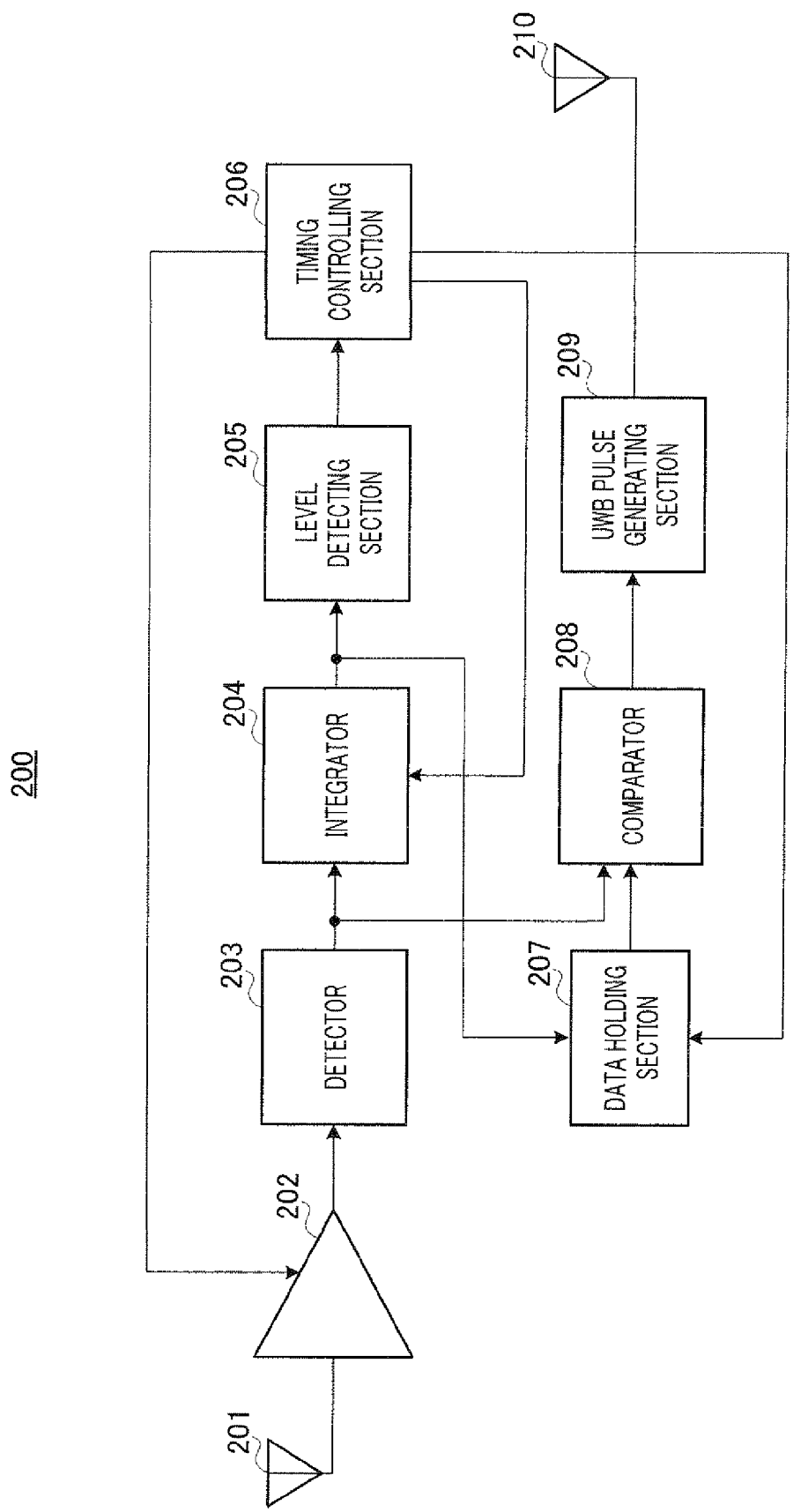
FIG. 4 is a block diagram showing a configuration of a wireless terminal of a wireless distance measurement system according to Embodiment 1 of the present invention.

FIG. 4 is a block diagram showing a configuration of wireless terminal 200 of the wireless distance measurement system according to Embodiment 1 of the present invention. Wireless terminal 200 is, for example, a tag that performs UWB communication.

In FIG. 4, wireless terminal 200 has receiving antenna 201, amplifier 202, detector 203, integrator 204, level detecting section 205, timing controlling section 206, data holding section 207, comparator 208, UWB pulse generating section 209 and transmitting antenna 210. Further, wireless terminal 200 has a power supply. As described later, UWB pulse generating section 209 generates a transmission pulse signal using power supplied from this power supply. That is, wireless terminal 200 adopts a semi-passive scheme.

Amplifier 202 is powered on and off based on on/off control signals outputted from timing controlling section 206. During; the on period, amplifier 202 amplifies the signal received through receiving antenna 201, and outputs the amplified received signal to integrator 204 and comparator 208. By contrast with this, during the off period, amplifier 202 stops the operation. Therefore, the output from amplifier 202 becomes a null signal during the off period.

Detector 203 detects the output signal from amplifier 202. Detector 203 is formed with, for example, a diode, and detects an envelope of the output signal from amplifier 202. For example, in case where the received signal is an OOK (On-Off-Keying) modulated signal of UWB of the impulse scheme, the detection result acquired in detector 203 becomes a baseband signal of about 1 to 2 nano seconds. The detection result acquired in detector 203 is outputted to integrator 204 and comparator 208.

Integrator 204 integrates the detection result received from detector 203, over an integration period having a certain time length. The duration of the integration period is controlled according to an integration period control signal from timing controlling section 206. Integrator 204 is formed with, for example, an analogue low pass filter. Instead, integrator 204 may employ a configuration including an analogue-to-digital converting section, and an adder that adds digital signals acquired in the analogue-to-digital converting section or a digital low pass filter.

In case where an analogue low pass filter is used in integrator 204, after the detection result is integrated for one integration period, the electrical charge accumulated in a capacitor is discharged according to a control signal from timing controlling section 206, thereby initializing the integrated value. Further, in case where integrator 204 employs a configuration including an adder or digital low pass filter, the integrated value is reset according to a control signal from timing controlling section 206 and then initialized.

Here, the above integration period is configured with J (where J is a natural number of 2 or greater) integration repeating unit periods. "J" is a value for acquiring a desired signal-to-noise ratio by increasing signal power. Further, one integration repeating unit period is configured with K (where K is a natural number of 2 or greater) unit integration periods. "K" is a value acquired from desired distance resolution capability. That is, each integration repeating unit period includes unit integration periods of period identification numbers 1 to K. Then, integrator 204 integrates a detection result, on a per period identification number over the integration period. The integration repeating unit period is controlled according to a repetition unit period control signal from timing controlling section 206, and the unit integration period is controlled according to a unit integration period control signal. The integrated value of each period identification number acquired in this way is outputted to level detecting section 205.

Level detecting section 205 receives K integrated values from integrator 204, and specifies the period identification number of the integration period having the maximum integrated value. The period identification number is outputted to timing controlling section 206.

Timing controlling section 206 controls the operations of amplifier 202, integrator 204 and data holding section 207 by outputting control signals. Timing controlling section 206 outputs on/off control signals to amplifier 202, and controls the on/off timing of amplifier 202. Further, timing controlling section 206 generates an integration period control signal, unit integration period control signal and unit integration period control signal, based on the period identification number specified in level detecting section 205, and outputs these signals to integrator 204 to control integration processing in integrator 204. Furthermore, timing controlling section 206 outputs a signal level holding control signal to data holding section 207, based on the period identification number specified in level detecting section 205, and controls the signal level holding operation and holding signal outputting operation of data holding section 207.

Wireless terminal 200 performs the two operations of "synchronization establishing operation" and "distance measuring operation" as described later, and timing controlling section 206 controls the operations of the above functioning sections according to the operation to be executed.

Data holding section 207 holds an integrated value matching a unit integration period that matches the signal level holding control signal, and outputs a voltage application signal matching the integrated value held, to one input port of comparator 208.

The first input port of comparator 208 receives the detection result of detector 203 as input, and the second input port receives the voltage application signal outputted from data holding section 207 as input. The voltage matching this voltage application signal is used as a comparison reference voltage.

Comparator 208 outputs a signal matching a result of comparison between the comparison reference voltage and the detection result, to UWB pulse generating section 209. To be more specific, in case where an input detection result is greater than the comparison reference voltage, comparator 208 outputs a high level signal. By contrast with this, in case where an input detection result is smaller than the comparison reference voltage, comparator 208 outputs a low level signal.

UWB pulse generating section 209 generates a signal matching the output signal from comparator 208. UWB pulse generating section 209 includes an amplifying circuit that performs excitation and amplification based on the output signal from comparator 208, and a bandpass filter. For example, a step recovery diode is used for the amplifying circuit, and, in this case, in UWB pulse generating section 209, the step recovery diode is excited (i.e. edge shock excitation) at one of the rising edge and the trailing edge of the long cycle clock signal to amplify the current and the bandpass filter limits the band of the resulting signal. By this means, a pulse signal having a pulse width of about 1 nano second (that is, a pulse width of about a short cycle) is generated. The pulse signal generated in this way is transmitted through transmitting antenna 210.

[The Operation of the Wireless Distance Measurement System]

The operation of the wireless distance measurement system having the above configuration will be explained assuming that the long cycle is 100 nano seconds and the short cycle is 1 nano second.

(The Pulse Signal Sequence Transmitting Operation of Base Station 100)

Base station 100 generates and transmits a pulse signal sequence to wireless terminal 200. The pulse signal sequence is transmitted both upon the synchronization establishing operation and distance measuring operation.

Figure 5:
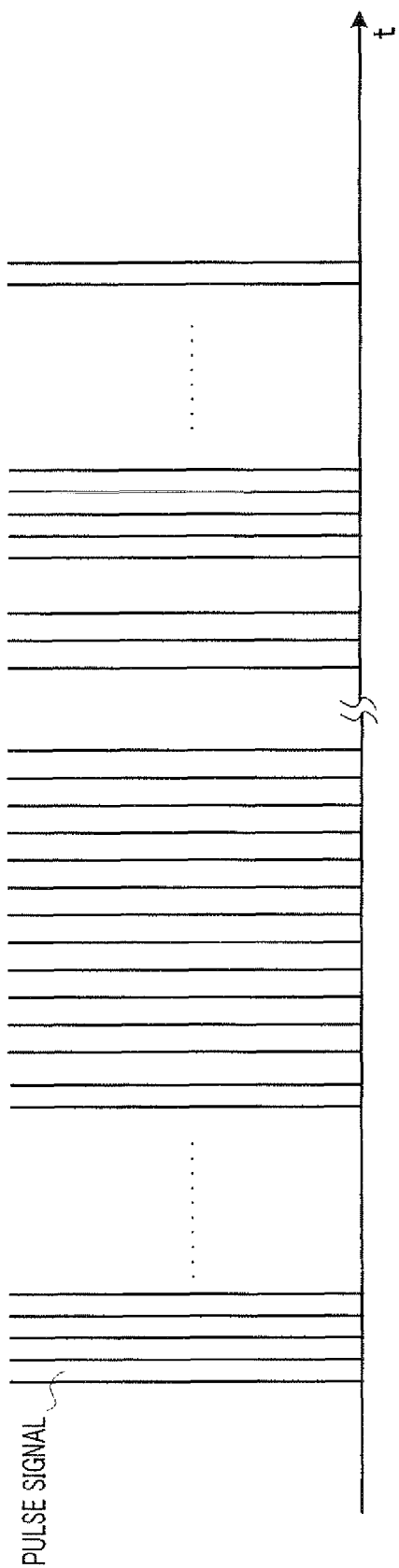
FIG. 5 shows a pulse signal sequence transmitted from a base station.

FIG. 5 shows a pulse signal sequence transmitted from base station 100. In FIG. 5, one vertical line represents one pulse signal. The time interval between neighboring pulse signals corresponds to the long cycle, and has 100 nano seconds. That is, base station 100 transmits UWB pulse signals of about 1 nano second at 100 nano second intervals.

(The Operation of Wireless Terminal 200)

The operation of wireless terminal 200 includes two of the synchronization establishing operation and distance measuring operation as described above. As explained below, a flow of signals varies between the synchronization establishing operation and distance measuring operation.

<The Synchronization Establishing Operation of Wireless Terminal 200>

Wireless terminal 200 is placed in sleep mode as the default state, and detects whether or not there is a received signal. In case where there is a received signal, wireless terminal 200 enters awake mode to start the synchronization establishing operation.

Figure 6:
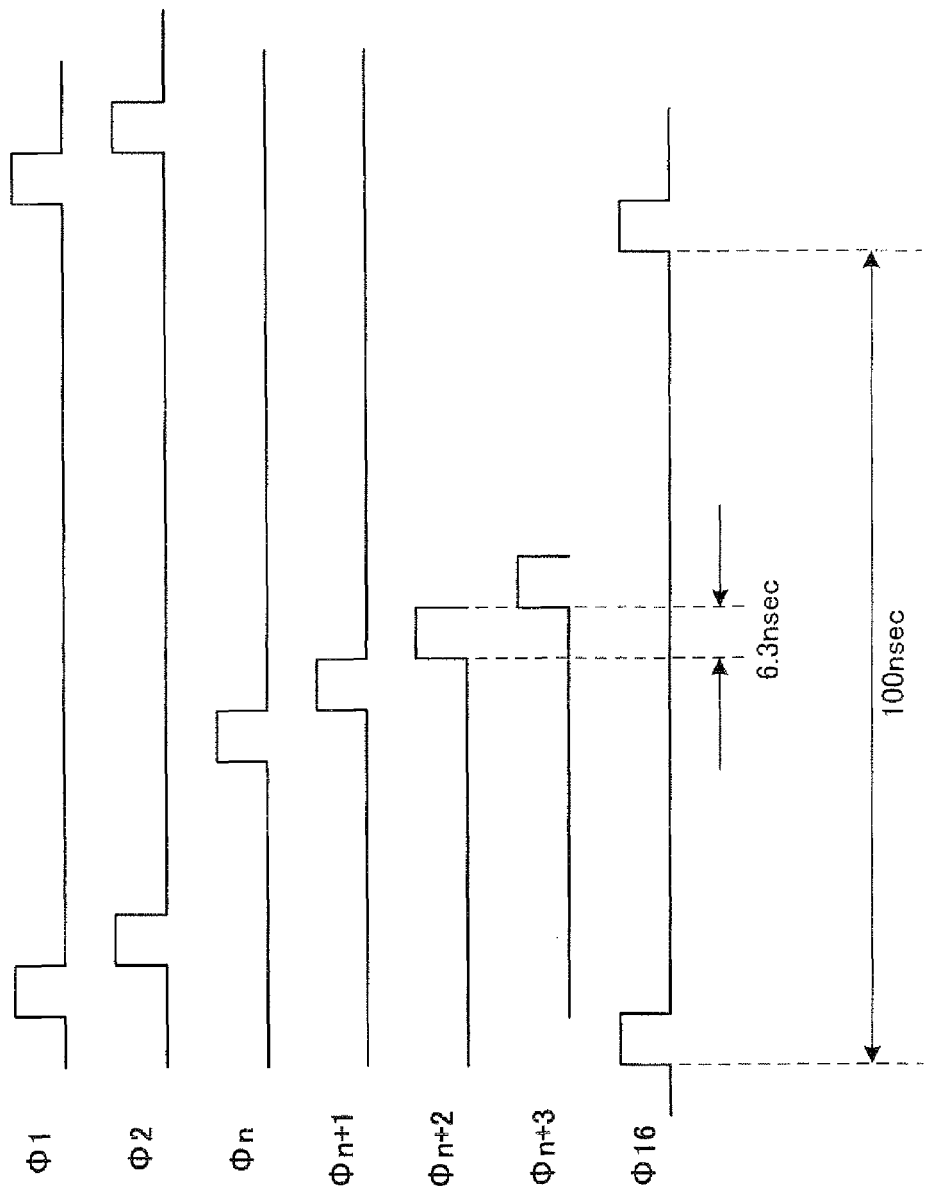
FIG. 6 shows clock signals generated by a timing controlling section.

Here, the operation of timing controlling section 206 will be explained first. FIG. 6 shows clock signals generated in timing controlling section 206.

In FIG. 6, timing controlling section 206 generates clock signals of 16 phases (Φ1 to Φ16). The clock signal of each phase is formed with a pulse signal that appears at a cycle of 100 nano seconds corresponding to the long cycle. One pulse signal has a pulse width of 100 nano seconds/16=about 6.3 nano seconds. The timings the pulse signals appear in clock signals of 16 phases are shifted such that constituent pulse signals do not overlap. Timing controlling section 206 generates clock signals of 16 phases from a 160 MHz clock signal using, for example, delay lines of 6.3 nano seconds.

Figure 7:
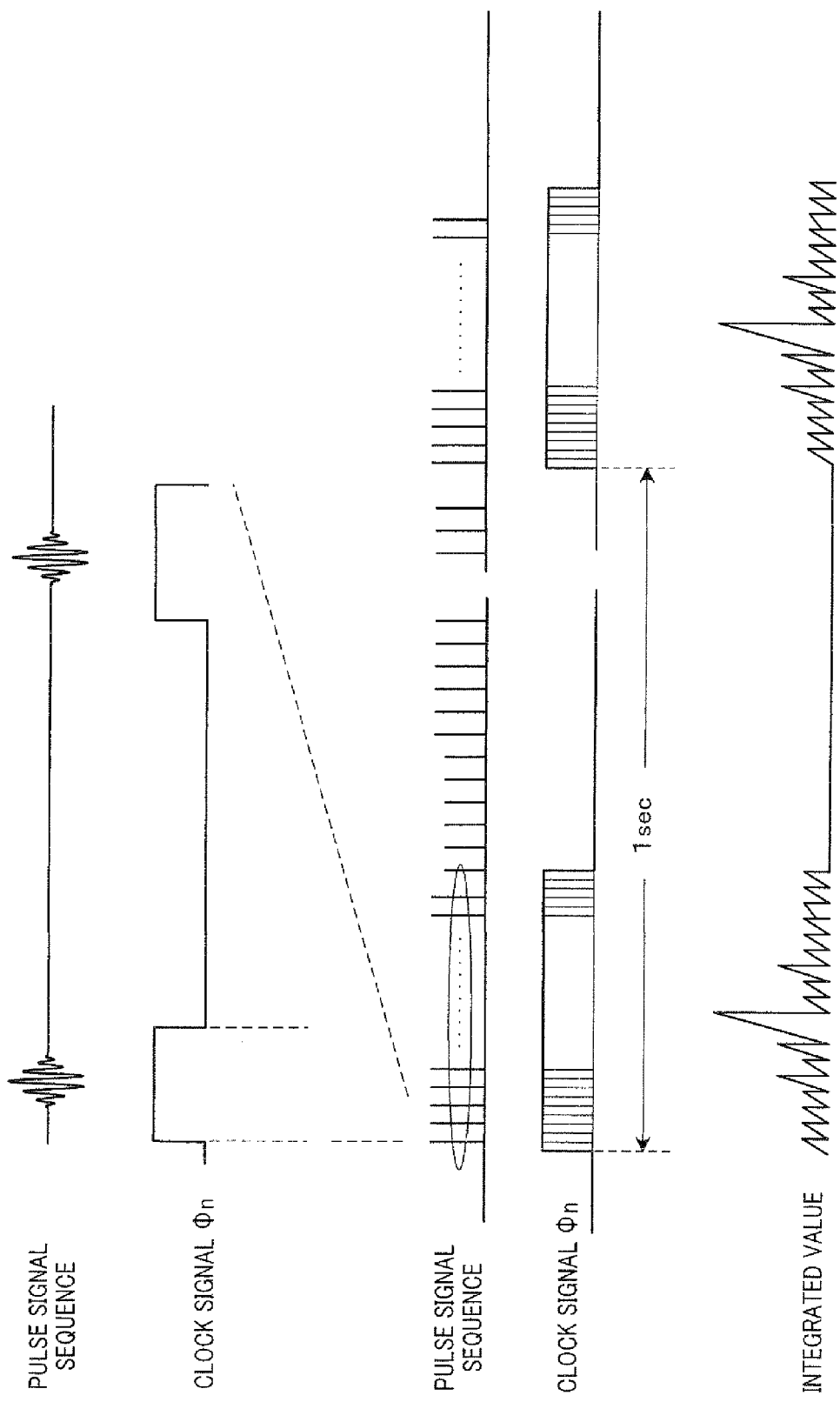
FIG. 7 illustrates synchronization establishing processing.

FIG. 7 illustrates synchronization establishing processing. In FIG. 7, the uppermost part shows a pulse signal sequence transmitted from base station 100, and the second row shows the n-th clock signal Φn of clock signals of 16 phases. In FIG. 7, the third row shows the receiving timing for a pulse signal sequence having pulse signals with 100 nano second intervals.

This received pulse signal sequence is inputted to amplifier 202. Upon the synchronization establishing operation, timing controlling section 206 outputs all of clock signals of 16 phases sequentially to amplifier 202 as on/off control signals.

These on/off control signals are shown in the fourth row in FIG. 7. As shown in the fourth row in FIG. 7, the periods for outputting clock signals are shifted. As an example, the first clock signal is outputted only in a period 128 times as that of the long cycle (that is, in a period in which 128 pulse signals are transmitted), and, after this period ends, the second clock signal is outputted in a period 128 times as that of the long cycle in the same way (here, in 12800 nano seconds, because the long cycle is 100 nano seconds). Then, clock signals of 16 phases are outputted sequentially by shifting outputting periods. Accordingly, a round of outputting the clock signals of 16 phases takes the time of 128 (pulses)×100 (nano seconds/pulse)×16 (phases)=204800 (nano seconds). Note that the above-noted value of 128 is a value set based on the degree of increasing the signal-to-noise ratio by integrating and increasing signal power, and, if the number of pulses is 128, the signal-to-noise ratio increases by 21 dB.

Then, these on/off control signals divide the on state of amplifier 202 into on periods of 16 phases. Accordingly, amplifier 202 inputs a received signal in the on period of each phase, to integrator 204 through detector 203.

For received signals acquired in the above on periods of phases integrator 204 integrates detection results over the integration period. The integration period corresponds to the periods for outputting clock signals, and therefore has 12800 nano seconds. The integration period is configured with a plurality of integration repeating unit periods, and the time length of this integration repeating unit period corresponds to the long cycle, that is, the pulse signal transmission interval (here, 100 nano seconds). That is, the value of J is 128. Each integration repeating unit period is formed with K unit integration periods, and the unit integration period is set according to the unit integration period control signal. Each unit integration period corresponds to an on period of amplifier 202. That is, the value of K is 16.

In integrator 204, clock signals used in each integration period vary, that is, integration unit periods used in integration in each integration period vary, so that it is possible to acquire integrated values matching each of period identification numbers 1 to 16. These integrated values are shown in the lowermost part in FIG. 7. Here, a received pulse signal appears at a cycle of 100 nano seconds, and therefore a peak appears in one of integrated values of period identification numbers 1 to 16. That is, unit integration periods of period identification numbers 1 to 16 are used as receiving timing candidates for pulse signals, and integrator 204 can acquire integrated values matching 16 receiving timing candidates, respectively.

Level detecting section 205 specifies a period identification number having the maximum integrated value in 16 integrated values (corresponding to the maximum peak in the lowermost part in FIG. 7). The timing matching this specified period identification number is the synchronization timing.

Here, each on period in amplifier 202 is used as a receive window, and the time length of each on period corresponds to the pulse width (about 6.3 nano seconds) of a pulse signal forming a clock signal. That is, the received window width becomes much wider than the pulse width transmitted from base station 100. Accordingly, rough synchronization is established in synchronization establishing processing performed here.

Then, timing controlling section 206 determines the reference timing for the distance measuring operation, that is, the timing to power on amplifier 202, based on the synchronization timing specified in the synchronization processing. The output signal from amplifier 202 is delayed by the time the processing takes to finish integration processing. Therefore, time corresponding to this processing delay is shifted in the clock signal that matches the maximum integrated value and that is inputted in integrator 204, and in the clock signal that is inputted to amplifier 202 when the received signal matching this maximum integrated value is amplified. Accordingly, timing controlling section 206 makes a clock signal the order corresponding to processing delay earlier from the identification number of the clock signal from which the maximum integrated value is acquired, the reference timing signal for the distance measuring operation. That is, in case where the processing delay corresponding to the time of one clock signal is anticipated, if the maximum integrated value is acquired with the clock signal Φn+1, timing controlling section 206 makes the clock signal Φn the reference timing signal for the distance measuring operation.

Further, timing controlling section 206 forms a signal level data holding signal based on the synchronization timing specified in the synchronization processing, and outputs the signal level data holding signal to data holding section 207. By this means, the output level of integrator 204 in the unit integration section in which the maximum integrated value is acquired is held.

<The Distance Measuring Operation of Wireless Terminal 200>

Figure 8:
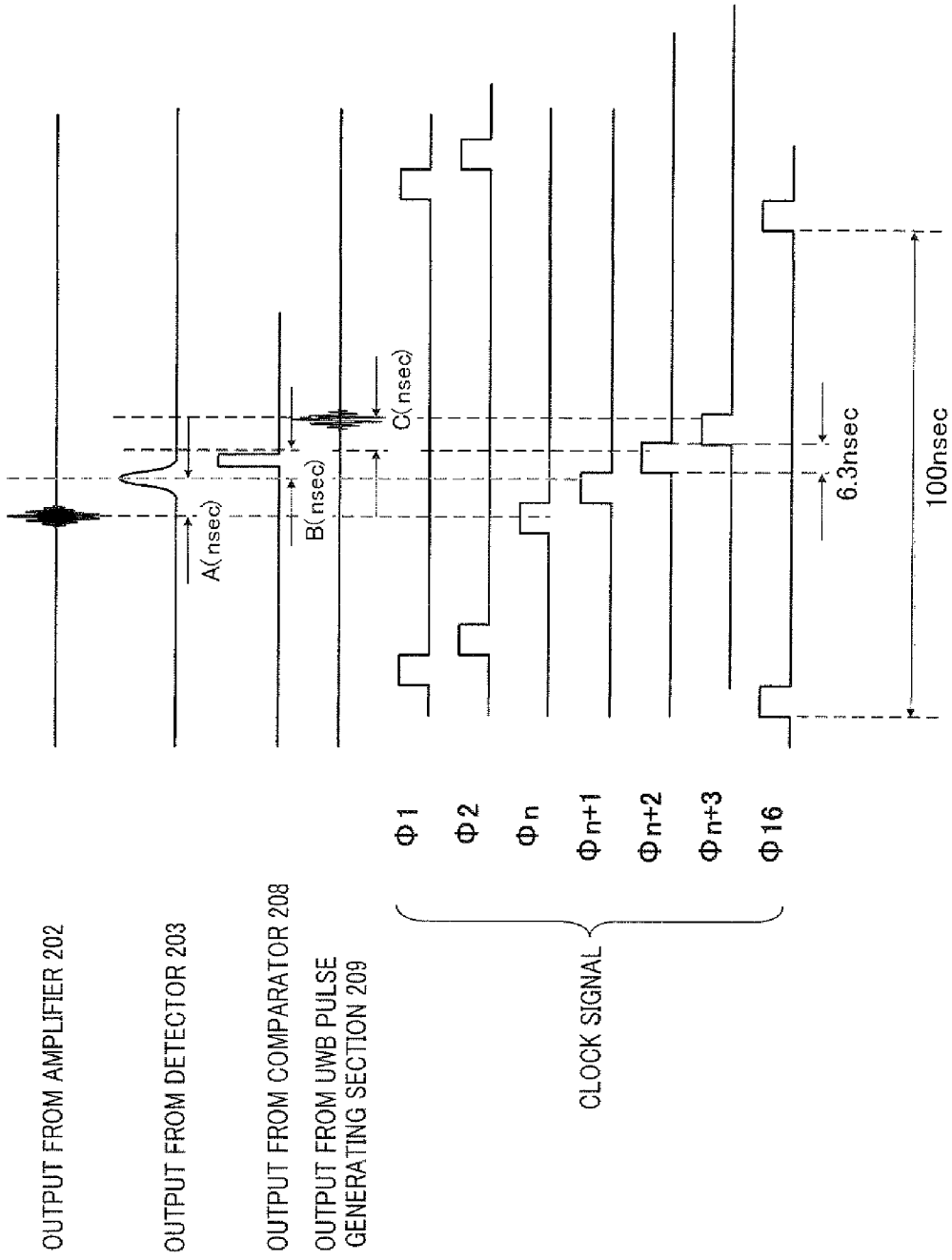
FIG. 8 illustrates a distance measuring operation.

FIG. 8 illustrates the distance measuring operation.

In FIG. 8, the uppermost part shows the received pulse signal amplified in amplifier 202 based on the reference timing signal for the distance measuring operation outputted from timing controlling section 206.

This amplified received pulse signal is subjected to detection processing in detector 203, and its detection result is outputted to comparator 208. In FIG. 8, the second row shows the waveform of this detection result. As shown in the same figure, there is circuit delay A (nano second) in detector 203.

The detection result outputted from detector 203 is inputted to one input port of comparator 208 without passing through integrator 204. Then, comparator 208 outputs the signal matching the result of comparison between the input detection result and the comparison reference voltage held in data holding section 207. The output signal from this comparator 208 becomes a rectangular waveform as shown in the third row of FIG. 8. As shown in the same figure, there is circuit delay B (nano second) in comparator 208.

Figure 9B:
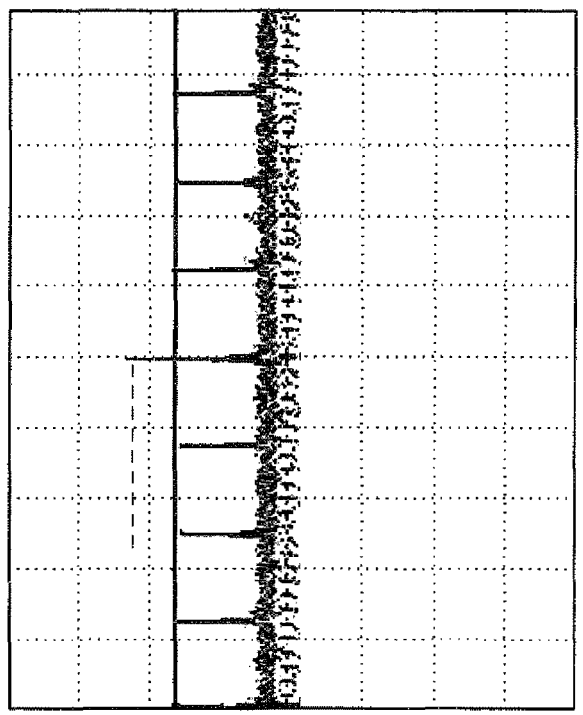
FIG. 9 shows an output waveform of a detector and an output waveform of an integrator in case where the output waveform of that detector is received as input.

The output signal from comparator 208 is inputted in FIG. 9B pulse generating section 209. UWB pulse generating section 200 generates a signal matching the output signal from comparator 208. By this means, a transmission pulse signal is generated in synchronization with a received pulse signal, so that wireless terminal 200 can radiate a pulse signal to base station 100 again. In FIG. 8, the fourth row shows the pulse signal generated in UWB pulse generating section 209. As shown in the same figure, there is circuit delay C (nano second) in UWB pulse generating section 209.

Figure 9A:
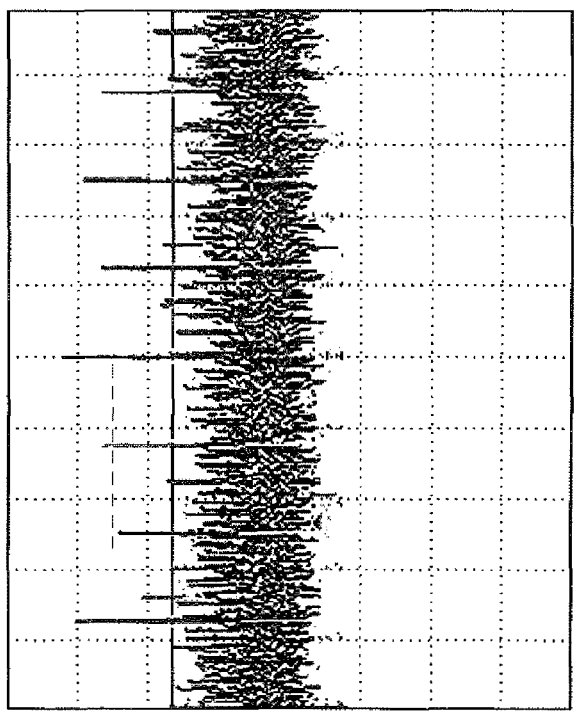

Here, the output signal from integrator 204 is used for the comparison reference voltage in comparator 208. FIG. 9 shows the output waveform, of detector 203 (see FIG. 9A) and the output waveform of integrator 204 in case where the output waveform of this detector 203 is inputted (see FIG. 9B). The peak portions that periodically appear significantly in both FIG. 9A and FIG. 9B correspond to received pulse signals, and the other portions correspond to noise signal components.

As is clear from FIG. 9A, the output signal from detector 203 includes a great number of noise signal components of significant signal levels. Therefore, it is difficult to clearly separate peak portions from noise signal components in the output signal from detector 203. In case where the output signal from this detector 203 is used for the comparison reference voltage in comparator 208, the accuracy of the comparison reference voltage deteriorates due to the influence of noise signal components and, as a result, there is a possibility that noise pulse signals which do not match pulse signals included in a received pulse signal sequence are included in a transmission pulse signal sequence of wireless terminal 200.

By contrast with this, as is clear from FIG. 9B, the input signal is subjected to integration processing in integrator 204, so that most of the noise signal components are removed. This is due to the randomness of noise signal components. Consequently, it is possible to accurately separate peak portions from noise signal components at ease in the output signal from integrator 204.

By using the level of a signal from which noise components are removed, in integrator 204 in this way, the comparison reference voltage in comparator 208 is optimized, so that it is possible to increase the probability that the pulse signal sequence received by wireless terminal 200 matches the pulse signal sequence transmitted from wireless terminal 200.

Further, during the on times of the above 16 phases in integrator 204, the received signal of wireless terminal 200 is very weak (that is, if the signal-to-noise ratio is about dB), the association of base station 100 and wireless terminal 200 makes it possible to improve sensitivity of distance measurement. That in case where the received signal level of wireless terminal 200 is small, this causes comparison between the threshold (that is, comparison reference voltage) in comparator 208 and noise, and therefore wireless terminal 200 results in outputting a pulse in response to noise. That is, the noise pulse signal is outputted. By contrast with this, base station 100 performs integration processing, so that it is possible to acquire processing gain. Consequently, the influence of the noise pulse signal outputted by error from wireless terminal 200 is removed.

Here, wireless terminal 200 outputs a pulse signal based on a comparison result binarized by comparator 208. Hence, the ratio of the noise level and the desired signal level matches the probability that a noise pulse signal is outputted. Accordingly, in case where only noise is detected inside wireless terminal 200, it is desirable that comparator 208 does not perform the operation of comparison. To be more specific, synchronization processing is performed with the present embodiment, so that comparator 208 can limit the portion for comparing a pulse and noise, only to a portion of a pulse signal and a portion of about ±8 nano seconds before and after this pulse signal. By so doing, the operation of comparison is not performed and a pulse is not transmitted in the other portions, so that it is possible to regard that the signal-to-noise value has improved. With the present embodiment, the frame cycle is 100 nano seconds and a rough synchronization cycle is 6.3 nano seconds, so that the signal-to-noise ratio improves by 1/(6.3/100)=15.9 times (that is, by 12 dB) by performing rough synchronization.

In this way, even if sensitivity is not improved by integration processing of the received signal in wireless terminal 200, base station 100 performs integration processing of the received pulse signal, so that overall sensitivity of distance measurement processing by base station 100 and wireless terminal 200 is anticipated to improve.

In the distance measuring operation of wireless terminal 200 explained above, timing controlling section 206 outputs clock signals to control operation timings for amplifier 202, detector 203, comparator 208 and UWB pulse generating section 209.

Assume that circuit delays A, B and C in above detector 203, comparator 208 and UWB pulse generating section 209 are each 6 to 7 nano seconds. In this case, the reference timing signal inputted in amplifier 202 is the clock signal Φn, and therefore timing controlling section 206 outputs the clock signals Φn+1, Φn+2, and Φn+3 to detector 203, comparator 208 and UWB pulse generating section 209, respectively.

Further, detector 203, comparator 208 and UWB pulse generating section 209 are powered on at all times, and the operation timings for detector 203, comparator 208 and UWB pulse generating section 209 are not controlled. However, to realize power saving, detector 203, comparator 208 and UWB pulse generating section 209 may be powered on and off based on clock signals received from timing controlling section 206.

<The Distance Measuring Operation of Base Station 100>

The pulse signal sequence outputted from wireless terminal 200 is received at base station 100.

Pulse detecting section 105 of base station 100 detects the received pulse signal, and outputs the detection result signal to integrating section 106.

Integrating section 106 samples the detection result signal received from pulse detecting section 105 in synchronization with a short cycle clock signal. As described above, the short cycle is about 1 nano second, and therefore integrating section 106 performs high speed sampling processing.

Then, integrating section 106 integrates a sample signal in a plurality of long cycles separately based on short cycle clock numbers.

Distance calculating section 107 calculates the distance between base station 100 and wireless terminal 200 (described later) based on the short cycle clock number of the maximum integrated value.

As described above, with the present embodiment, a route of signals varies between the distance measuring operation and synchronization establishing operation in wireless terminal 200, and, when the distance measuring operation is performed, the detection result is inputted to comparator 208 without passing through integrator 204.

By this means, the distance measuring operation of wireless terminal 200 does not involve integration processing, so that the delay time due to integration processing is not produced, and, consequently, it is possible to improve the accuracy of distance measurement performed by base station 100 and wireless terminal 200.

Further, the distance measuring operation uses the integration result acquired in integrator 204 for the comparison reference voltage used in comparator 208. Particularly, the integration result acquired from a synchronization timing established in the synchronization establishing operation is used for reference data.

By this means, the integration result removing noise signal components from a detection signal is used as a comparison reference voltage, so that the comparison reference voltage is optimized. As a result, it is possible to further improve the accuracy of distance measurement performed by base station 100 and wireless terminal 200.

In the distance measuring period in which the distance measuring operation is performed, timing controlling section 2061 of wireless terminal 200 powers on amplifier 202 at the synchronization timing, and powers off amplifier 202 at timings other than the synchronization timing.

Consequently, power is saved in wireless terminal 200. Further, noise signal components received at timings other than the synchronization timing are not outputted to components subsequent to amplifier 202, so that it is possible to alleviate negative influences of noise signal components in distance measurement processing. Furthermore, at timings other than specific timings, the amplifier of the wireless terminal is powered off. Consequently, it is possible to prevent a transmission signal from the base station that is received in the wireless terminal, from reaching around the receiving antenna of the wireless terminal, and prevent malfunctions of an oscillating operation.

Timing controlling section 206 of wireless terminal 200 powers on integrator 204 in the synchronization establishing period in which the synchronization establishing operation is performed, and powers off integrator 204 in the distance measuring period.

By this means, it is possible to reduce power consumption of wireless terminal 200 in the distance measuring period.

Further, integrating section 106 of base station 100 samples the detection result signal received from pulse detecting section 105, in synchronization with a short cycle clock signal, and integrates the sampled signal separately based on short cycle clock numbers.

Consequently, it is possible to set details of receiving timing candidates and improve the accuracy of receiving timing detection. Further, a signal sampled per receiving timing candidate set in detail is integrated, so that it is possible to remove noise signal components included in the sampled signal. That is, it is possible to improve the signal-to-noise ratio (S/N) that cannot be improved by the distance measuring operation of wireless terminal 200. Therefore, it is possible to further improve the accuracy of receiving timing detection. Consequently, it is possible to calculate the distance using accurately detected receiving timings and improve the accuracy of distance measurement.

Embodiment 2

Figure 10:
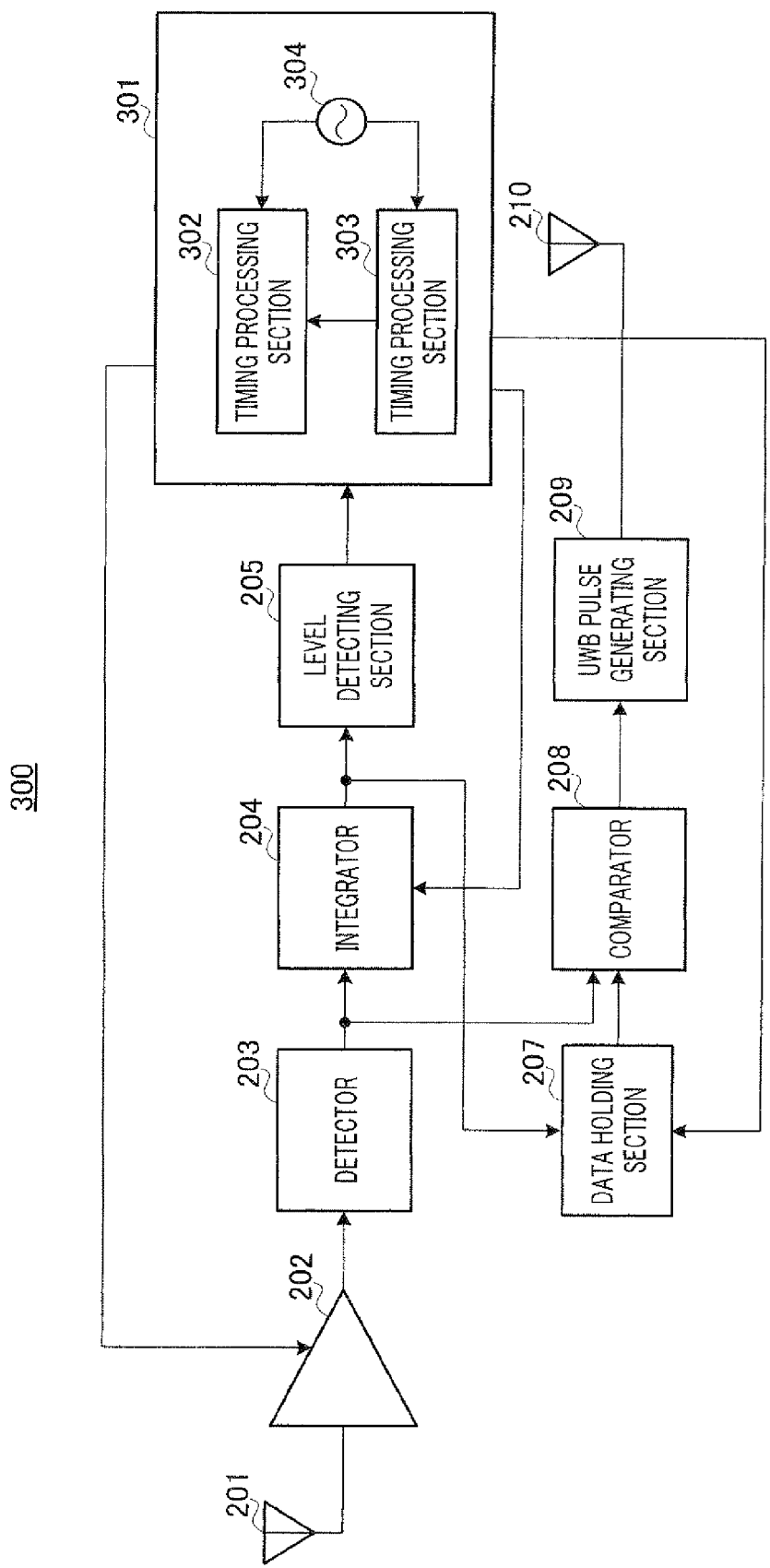
FIG. 10 is a block diagram showing a configuration of a wireless terminal according to Embodiment 2 of the present invention.

FIG. 10 is a block diagram showing a configuration of wireless terminal 300 according to Embodiment 2 of the present invention. In FIG. 10, the blocks having the same reference numerals as in FIG. 4 will perform the same operations as the operations explained in Embodiment 1. In FIG. 10, wireless terminal 300 has timing controlling section 301. Timing controlling section 301 has timing processing section 302, timing processing section 303 and oscillator 304. Although wireless terminal 200 of FIG. 4 also has an oscillator (not shown), particularly, FIG. 10 expressly shows oscillator 304 that is connected to timing processing section 302 and timing processing section 303.

Timing processing section 302 performs the same processing as timing controlling section 206 of wireless terminal 200 explained in Embodiment 1. That is, timing processing section 302 controls the operations of amplifier 202, integrator 204 and data holding section 207 based on the first synchronization timing established in the first synchronization establishing period.

Timing processing section 303 controls the operations of amplifier 202, integrator 204 and data holding section 207 based on the second synchronization timing established in the second synchronization establishing period overlapping the distance measuring period.

Oscillator 304 oscillates a reference signal used to generate a unit integration period control signal in timing processing section 302 and timing processing section 303. Oscillator 304 is, for example, a crystal oscillator. The accuracy of a practical, civilian crystal oscillator is about dozens of ppm to several ppm.

The relationship between the accuracy of oscillator 304 and the unit integration period will be explained. Note that the pulse width of a UWB pulse used in the wireless distance measurement system is about from 1 nano second to 2 nano seconds, and the unit integration period is a 6.3 nano period similar to Embodiment 1. Further, assume that the accuracy of the crystal oscillator is 10 ppm.

In case where it is assumed that the accuracy of the frequency reference of base station 100 is good enough compared to 10 ppm, if the accuracy of oscillator 304 of wireless terminal 300 is 10 ppm, it takes 630000 nano seconds until 6.3 nano seconds (corresponding to an on period of one phase in the on periods of 16 phases) is shifted in a signal that is regarded to have the same cycle (for example, long cycle) between base station 100 and wireless terminal 300. By contrast with this, as explained in Embodiment 1, a round of outputting clock signals of 16 phases needs to be finished until the unit integration period is set, and takes the time of 128 (pulses)×100 (nano seconds/pulse)×16 (phases)=204800 (nano seconds). Consequently, the amount of shifts in 16 phase clocks produced until the synchronization establishing operation is established settles in the allowable range.

However, if the processing time of the distance measuring operation after the synchronization establishing operation explained in Embodiment 1 is completed, continues longer than 630000 nano seconds, synchronization established once breaks. In order to support this, it is possible to simply reduce the number of clock phases from 16. However, deterioration in sensitivity or power consumption occurs. Hence, with the present embodiment, timing controlling section 301 operates as follows.

Timing processing section 303 of timing controlling section 301 controls the operations of amplifier 202, integrator 204 and data holding section 207 based on the second synchronization timing established in the second synchronization establishing period included in the distance measuring period.

That is, after timing processing section 302 transitions to the distance measuring operation by fixing the first synchronization timing, timing processing section 303 controls the operations of amplifier 202, integrator 204 and data holding section 207 based on the period identification number specified in level detecting section 205 in the second synchronization establishing period.

The accuracy of the oscillator of base station 100 differs from the accuracy of the oscillator of wireless terminal 300, and therefore if 630000 nano seconds pass from the time when synchronization was established previously, the period identification number specified in level detecting section 205 is shifted by one, that is, the phase of the maximum integrated value transitions to a neighboring phase in 16 phases. Accordingly, timing processing section 303 reports the degree of change in the phase of the synchronization clock during the distance measuring operation, to timing processing section 302 to make timing processing section 302 control the operations of amplifier 202, integrator 204 and data holding section 207 based on the second synchronization timing.

As described above, according to the present embodiment, even after timing processing section 302 transitions to the distance measuring operation by fixing the first synchronization timing, timing processing section 303 controls the operations of amplifier 202, integrator 204 and data holding section 207 based on the period identification number specified in level detecting section 205 in the second synchronization establishing period.

By so doing, it is possible to prevent synchronization from breaking in the distance measuring period, so that it is possible to prevent deterioration in the signal-to-noise ratio, and perform accurate distance measurement.

Industrial Applicability

The wireless distance measurement system and wireless terminal according to the present invention are useful to improve the accuracy of distance measurement when the UWB communication scheme is used.

The invention claimed is:

1. A wireless distance measurement system that comprises a wireless base station and a wireless terminal and that measures a distance between the wireless base station and the wireless terminal using a pulse signal, wherein:
  the wireless terminal comprises:
    a receiving section that receives a pulse signal sequence transmitted from the wireless base station;
    a detector that detects the received pulse signal sequence and outputs a detection signal;
    a synchronization establishing section that comprises:
      an integrator that integrates the detection signal per receiving timing candidate and outputs an integration result; and
      a detecting section that detects a synchronization timing with the wireless base station based on the integration result; and
    a distance measurement processing section that comprises:
      a holding section that holds the integration result;
      a comparator that outputs a binary signal matching an input signal using the integration result held in the holding section as reference data; and
      a pulse generating section that generates a transmission pulse signal based on the binary signal outputted from the comparator;
  the wireless base station comprises a calculating section that measures a time lag between a transmission timing for the pulse signal sequence and a receiving timing for a pulse signal sequence transmitted from the wireless terminal based on a pulse signal transmitted at the transmission timing, and calculates the distance based on the measured time lag; and
  a route of signals varies between a distance measuring operation and a synchronization establishing operation in the wireless terminal, and, when the distance measuring operation is performed, the detection signal is inputted to the comparator without passing through the integrator.

2. The wireless distance measurement system according to claim 1, wherein the wireless terminal further comprises:
  an amplifier that amplifies a pulse signal sequence inputted to the detector; and
  a timing controlling section that powers on the amplifier at the synchronization timing, and powers off the amplifier at timings other than the synchronization timing in a distance measuring period in which the distance measuring operation is performed.

3. The wireless distance measurement system according to claim 2, wherein the timing controlling section powers on the integrator in a synchronization establishing period in which the synchronization establishing operation is performed, and powers off the integrator in the distance measuring period.

4. The wireless distance measurement system according to claim 2, wherein the timing controlling section powers on the integrator at a second synchronization timing detected in the synchronization establishing section, and powers off the integrator at timings other than the second synchronization timing in a second synchronization establishing period included in the distance measuring period.

5. The wireless distance measurement system according to claim 1, wherein:
the holding section holds an integration result acquired from the synchronization timing, in a synchronization establishing period in which the synchronization establishing operation is performed; and
the comparator uses the integration result held in the synchronization establishing period, as the reference data in a distance measuring period in which the distance measuring operation is performed.

6. The wireless distance measurement system according to claim 1, wherein the wireless base station further comprises:
a receiving section that receives the transmission pulse signal transmitted from the wireless terminal;
a section that samples the transmission pulse signal transmitted from the wireless terminal at a cycle shorter than a cycle for transmitting a pulse signal forming the pulse signal sequence, and integrates the sampled signal; and
a detecting section that detects the receiving timing based on the sampled signal.

7. A wireless terminal comprising:
a receiving section that receives a pulse signal sequence;
a detector that detects the received pulse signal sequence and outputs a detection signal;
a synchronization establishing section that comprises:
an integrator that integrates the detection signal per receiving timing candidate and outputs an integration result; and
a detecting section that detects a synchronization timing with a wireless base station based on the integration result; and
a distance measurement processing section that comprises:
a holding section that holds the integration result;
a comparator that outputs a binary signal matching an input signal using the integration result held in the holding section as reference data; and
a pulse generating section that generates a transmission pulse signal based on the binary signal outputted from the comparator,
wherein a route of signals varies between a distance measuring operation and a synchronization establishing operation and, when the distance measuring operation is performed, the detection signal is inputted to the comparator without passing through the integrator.

8. The wireless terminal according claim 7, further comprising:
an amplifier that amplifies a pulse signal sequence inputted to the detector; and
a timing controlling section that powers on the amplifier at the synchronization timing, and powers off the amplifier at timings other than the synchronization timing in a distance measuring period in which the distance measuring operation is performed.

9. The wireless terminal according to claim 8, wherein the timing controlling section powers on the integrator in a synchronization establishing period in which the synchronization establishing operation is performed, and powers off the integrator in the distance measuring period.

10. The wireless terminal according to claim 7, wherein:
the holding section holds an integration result acquired from the synchronization timing, in a synchronization establishing period in which the synchronization establishing operation is performed; and
the comparator uses the integration result held in the synchronization establishing period, as the reference data in a distance measuring period in which the distance measuring operation is performed.

* * * * *

UNITED STATES PATENT AND TRADEMARK OFFICE
CERTIFICATE OF CORRECTION

| | | |
|---|---|---|
| PATENT NO. | : 8,165,248 B2 | Page 1 of 1 |
| APPLICATION NO. | : 12/639754 | |
| DATED | : April 24, 2012 | |
| INVENTOR(S) | : Takashi Fukagawa et al. | |

It is certified that error appears in the above-identified patent and that said Letters Patent is hereby corrected as shown below:

Claim 8, column 16, line 9 incorrectly reads:

"8. The wireless terminal according claim 7, further com-"

and should read:

"8. The wireless terminal according to claim 7 further com-"

Signed and Sealed this
Twelfth Day of February, 2013

Teresa Stanek Rea
*Acting Director of the United States Patent and Trademark Office*